United States Patent [19]
Lecea et al.

[11] Patent Number: 5,942,195
[45] Date of Patent: Aug. 24, 1999

[54] CATALYTIC PLASMA EXHAUST CONVERTER

[75] Inventors: Oscar Alfonso Lecea, El Paso, Tex.; Sara Ann Touse-Shunkwiler, Grand Blanc, Mich.

[73] Assignee: General Motors Corporation, Detroit, Mich.

[21] Appl. No.: 09/027,780

[22] Filed: Feb. 23, 1998

[51] Int. Cl.$^6$ ................................ F01N 3/10; B01J 19/12
[52] U.S. Cl. ..................... 422/174; 422/171; 422/177; 422/186; 422/186.04; 60/275
[58] Field of Search .................... 422/174, 171, 422/177, 199, 186, 186.04, 186.21, 186.22, 186.23; 60/275, 299, 300

[56] References Cited

U.S. PATENT DOCUMENTS

| | | | |
|---|---|---|---|
| 5,131,941 | 7/1992 | Lemelson | 75/10.19 |
| 5,236,672 | 8/1993 | Nunez et al. | 422/186.04 |

OTHER PUBLICATIONS

Vehicle Exhaust Treatment Using Electrical Discharge Methods; R. Tonkyn, S. Barlow, M. L. Balmer & T. Orlando; Pacific Northwest Nat'l Laboratory and D. Goulette, No Date.

Delphi Energy & Engine Management Systems; SAE Paper #971716; May 5–8, 1997.

*Primary Examiner*—Hien Tran
*Attorney, Agent, or Firm*—Vincent A. Cichosz

[57] ABSTRACT

A catalytic plasma converter combines oxidation and reduction of exhaust gas emissions such as HC, CO, NO and NOx by providing a pair of catalytic metallic porous elements, such as electrically conductive metal matrix material, spaced apart to define an intermediate reaction chamber. High voltage electric charges of opposite polarity applied to the two elements generate a gas plasma in exhaust gases passing through the converter reaction chamber. Passage of gases through the catalytic elements oxidizes CO and HC emissions present in the exhaust gases while the gas plasma in the reaction chamber causes reduction of NO and NOx and further reaction of HC and CO exhaust emissions.

6 Claims, 1 Drawing Sheet

CATALYTIC PLASMA EXHAUST CONVERTER

TECHNICAL FIELD

This invention relates to exhaust gas treatment devices especially for vehicles and particularly to a catalytic plasma exhaust gas converter for oxidizing HC and CO and reducing NO and NOx in engine exhaust gases.

BACKGROUND OF THE INVENTION

It has been previously proposed to provide vehicle engine exhaust gas treatment with electrical discharge methods utilizing plasmasurface interactions to lower concentrations of hydrocarbons and NO and NOx in exhaust gas streams. The system involves a plasma chamber formed within an electrically insulated container packed with an inner bed of glass beads or the like and having an electrical charge applied between positive and negative electrodes which generate a plasma reaction within the chamber. It is believed that practical application of this concept to actual vehicle exhaust gas emission control has yet to be made.

SUMMARY OF THE INVENTION

The present invention proposes a catalytic plasma exhaust gas converter for use in vehicle exhaust emission control. In one embodiment, the converter housing comprises a ceramic tube having a high dielectric constant and internally enclosing a gas flow path in which are disposed a pair of spaced first and second catalytic elements with a plasma reaction chamber therebetween. The catalytic elements are preferably formed of a high porosity metal matrix material that is wash coated, catalyzed and electrically conductive. The intermediate catalytic chamber may be filled with a bed of inert ceramic pellets to provide a tortuous flow path to the chamber. The dielectric constant of the pellet bed should be high but lower than that of the housing. Means are provided to charge the spaced catalytic elements with positive and negative high voltage charges so that the elements act as electrodes, applying a high voltage across the reaction chamber between the elements.

In operation, exhaust gas flowing through the ceramic tubular housing passes through the first catalytic element where HC and CO are oxidized. The gas then passes through the plasma chamber where an ion field reacts NOx, HC and CO in an electrically induced plasma reaction. Finally the gas passes through the second electrically charged catalytic element where further oxidation of HC and CO may take place. The catalytic elements may be electrically heated to increase the oxidation reaction during warm up of the vehicle engine.

These and other features and advantages of the invention will be more fully understood from the following description of certain specific embodiments of the invention taken together with the accompanying drawings.

DESCRIPTION OF THE PREFERRED EMBODIMENT

Figure 1:
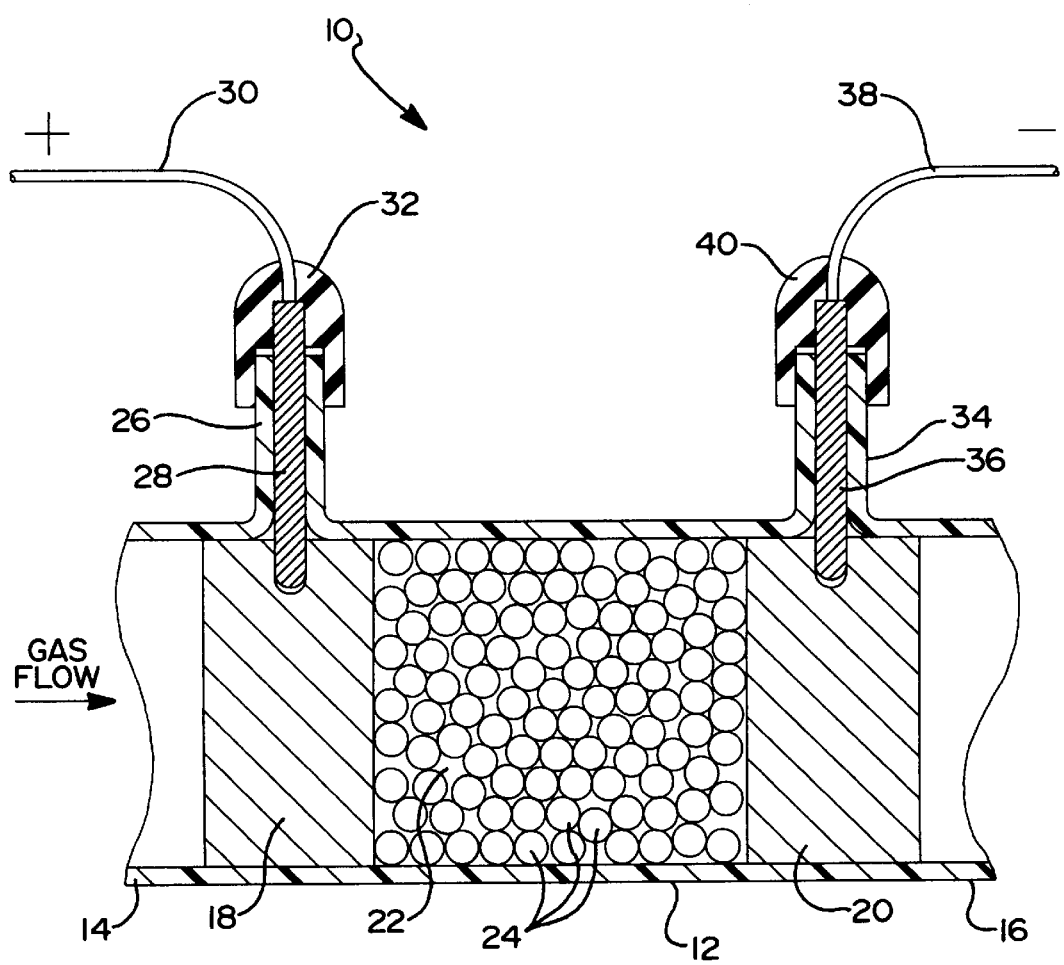
FIG. 1 is a cross-sectional view illustrating a preferred form of catalytic plasma converter according to the invention.

Referring now to the drawings in detail, numeral 10 generally indicates one possible form of catalytic plasma converter formed in accordance with the invention. Converter 10 includes a housing 12 preferably formed as a high dielectric ceramic tube defining therein a flow path for gas from one end 14 to the other end 16 of the tube. Between the ends 14, 16 a catalytic first element 18 is spaced upstream of a catalytic second element 20. The catalytic elements 18, 20 comprise a high porosity metal matrix material. According to one known technique, the porous metal matrix material is formed by impregnating an open-cell, porous structure with a suspension of powdered metal, driving off the suspension medium, and sintering the metal particles together. Each catalytic element 18, 20 is coated with one or more catalyst coating of a known type for promoting oxidizing or reduction reactions, or both, in internal combustion engine exhaust gas.

Between the elements 18, 20 is defined a reaction chamber 22 that is filled with a porous material, preferably a bed of inert ceramic pellets 24. Near the upstream end 14 of the housing 12, a tubular protrusion 26 receives an electrical connector 28 connected by an insulated conductor 30 to a positively charged source of high voltage electrical current, not shown. A rubber boot 32 covers the connector and seals the end of the tubular protrusion 26. The connector 28 extends into the porous metal matrix of the first element 18 so that, in operation, it forms a positive electrode operative within the housing 12.

Near the downstream end 16 of the housing 12 there is formed a second tubular protrusion 34 receiving an electrical connector 36 connected by conductor 38 with a negative high voltage electrical source not shown. In a vehicle, the negative conductor 38 may be grounded if desired. A rubber boot 40 encloses the end of the connector 36 and seals the end of the tubular protrusion 34. Connector 36 extends into electrical contact with the metal matrix material of the second element 20 so that, in use, it forms a negative electrode operative within the housing 12.

In operation, vehicle exhaust gases are passed through the catalytic plasma converter from the upstream end 14 of the housing to the downstream end 16. The gases pass first through the catalytic first element 18 where the catalyst coated metal matrix, which may be heated if desired, promotes the oxidation of HC and CO emissions. The exhaust gas subsequently passes through the reaction chamber 22 in which a plasma or ion field is generated by the high voltage applied to the chamber between the first and the second charged elements 18, 20. The electrical plasma operates to promote the reduction of NO and NOx as well as oxidation of HC and CO emissions present in the exhaust gases. The gas thereafter passes through catalytic second element 20 which continues to promote the oxidation of any HC and CO remaining in the exhaust gases.

The invention thereby provides a combined oxidation and reduction catalytic plasma converter capable of reducing emissions of HC, CO, and NO, NOx in the exhaust gases of an internal combustion engine powered vehicle.

While the invention has been described by reference to a specific embodiment, it should be understood that numerous changes could be made within the spirit and scope of the inventive concepts described. Accordingly it is intended that the invention not be limited to the disclosed embodiment, but that it have the full scope permitted by the language of the following claims.

We claim:

1. A catalytic plasma converter characterized by:
   a housing defining a through gas flow path enclosed by walls having a high dielectric constant;

a first element of porous electrically conductive material disposed in said housing across said flow path and allowing gas flow therethrough, said first element having an oxidation promoting catalytic coating;

a second element of porous electrically conductive material disposed in said housing across said flow path and allowing gas flow therethrough, said second element spaced downstream of said first element;

a reaction chamber defined in said housing between said first and second elements, said chamber being filled with a porous material of relatively high dielectric constant lower than that of said housing and formed to cause a tortuous flow of gas through the reaction chamber; and means for applying high voltage electric charges to said first and second elements, wherein the first and second elements act as electrodes effective to create a plasma reaction in exhaust gas passing through said reaction chamber;

whereby said first element promotes oxidation of HC and CO in the exhaust gases and the plasma reaction promotes reduction of NOx and reaction of HC and CO in the reaction chamber.

2. A catalytic plasma converter as in claim 1 wherein said second element also has an oxidation promoting catalytic coating.

3. A catalytic plasma converter as in claim 2 wherein said first and second elements are formed of a high porosity metal matrix material washcoated, catalyzed and electrically conductive.

4. A catalytic plasma converter as in claim 1 wherein said porous material in the reaction chamber is a bed of inert ceramic pellets.

5. A catalytic plasma converter as in claim 1 wherein:

said housing is a ceramic tube;

said porous material in the reaction chamber is a bed of inert ceramic pellets; and said first and second elements are formed of a high porosity metal matrix material washcoated, catalyzed and electrically conductive.

6. A catalytic plasma converter as in claim 5 wherein:

said first and second elements are electrically heated.

* * * * *